F. M. STILGENBAUER.
TRACTOR.
APPLICATION FILED MAY 7, 1918.

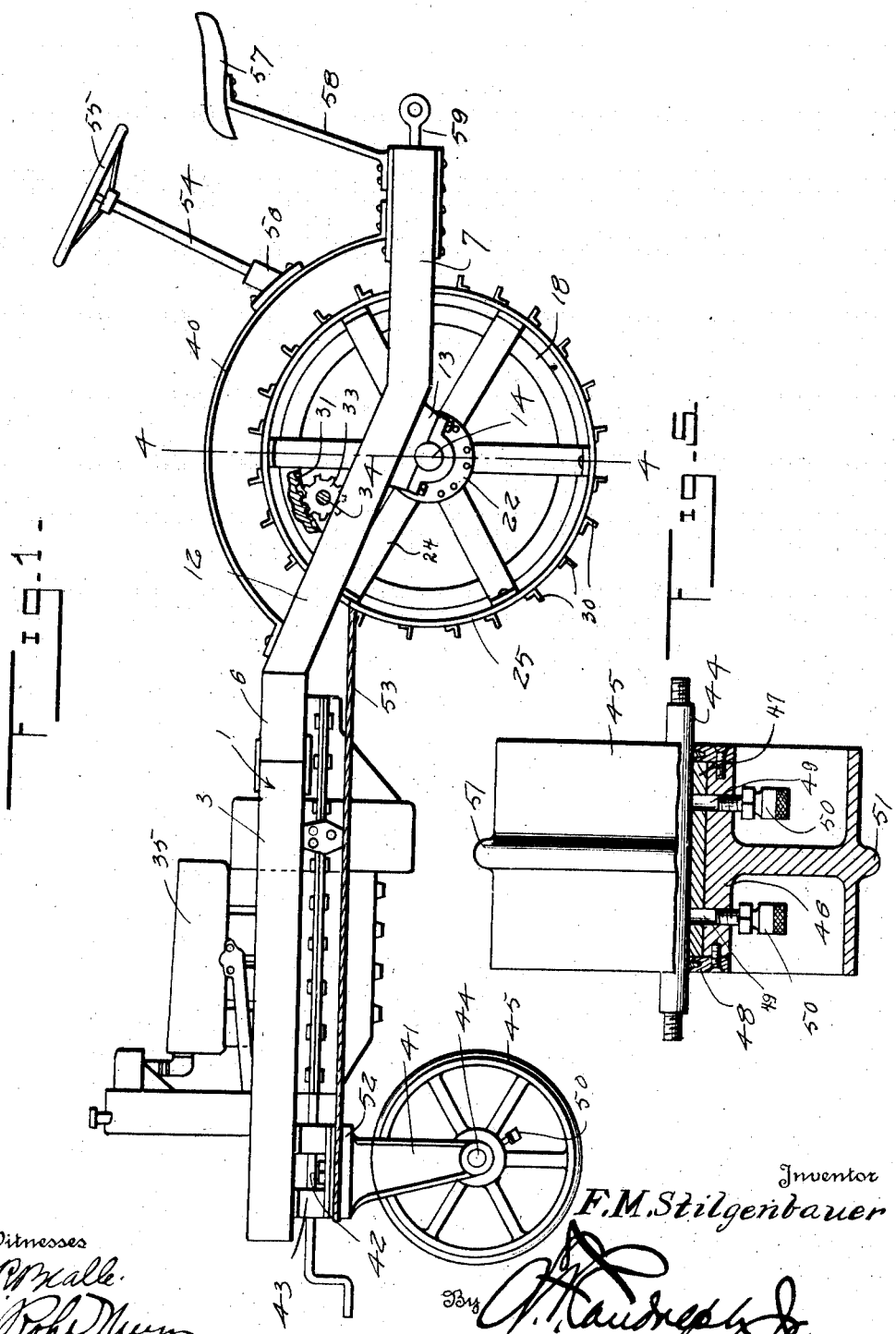

1,390,936.

Patented Sept. 13, 1921.
3 SHEETS—SHEET 2.

F. M. STILGENBAUER.
TRACTOR.
APPLICATION FILED MAY 7, 1918.
1,390,936.
Patented Sept. 13, 1921.
3 SHEETS—SHEET 3.
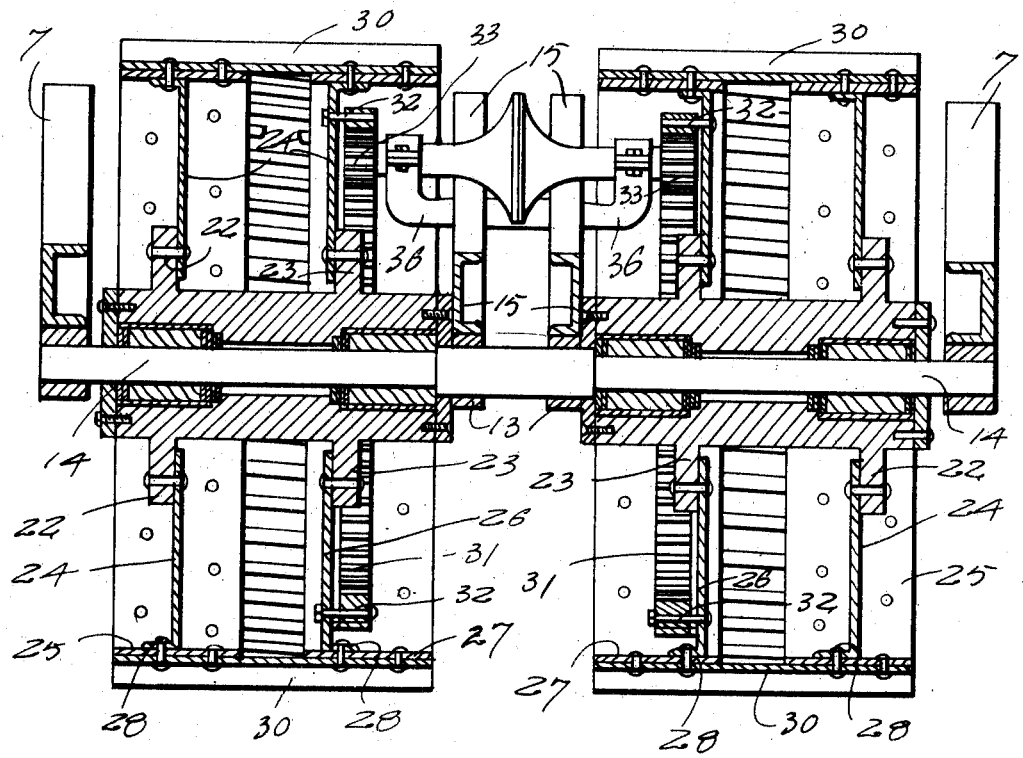
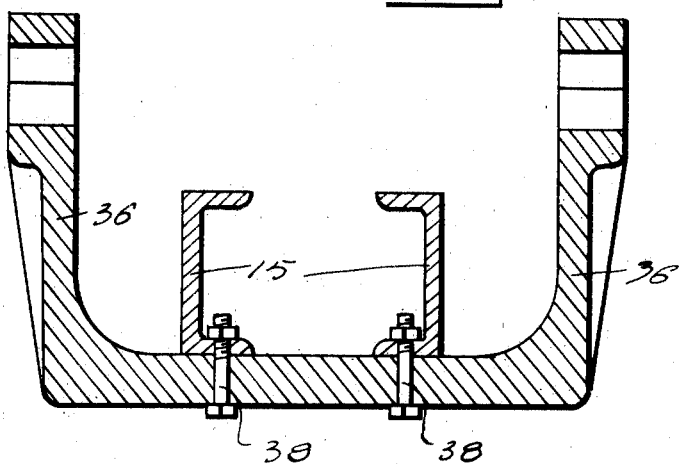
Witnesses
C. R. Beall
E. Wright
Inventor
F. M. Stilgenbauer
By
Randolph Co.
Attorney

UNITED STATES PATENT OFFICE.

FRED MILES STILGENBAUER, OF SHEPHERD, MICHIGAN.

TRACTOR.

1,390,936.     Specification of Letters Patent.     Patented Sept. 13, 1921.

Application filed May 7, 1918. Serial No. 233,044.

*To all whom it may concern:*

Be it known that I, FRED MILES STILGENBAUER, a citizen of the United States, residing at Shepherd, in the county of Isabella and State of Michigan, have invented certain new and useful Improvements in Tractors; and I do hereby declare the following to be a full, clear, and exact description of the invention, such as will enable others skilled in the art to which it appertains to make and use the same.

This invention relates to tractors, and the primary object of the invention is to provide a relatively small tractor which is adaptable to replace horses, mules or other draft animals upon a farm of such size where large tractors would be impractical.

An object of this invention is to provide a tractor as specified which includes a supporting frame provided with a relatively narrow front portion which supports the engine or prime mover of the tractor and which supports beneath its forward end the front wheel of the tractor which is swivelly connected to the supporting frame and further a pair of parallel portions formed on the rear end of the frame in which are mounted the bull or drive wheels of the tractor and to construct the frame so that the portion thereof which carries the bearings of the axles that support the bull wheels is lower than the front relatively narrow portion of the frame. A still further object of this invention is to provide a novel form of drive wheel construction for the tractor which drive wheels include a hub structure having radiating flanges formed thereupon which flanges are connected by means of metal spokes to a pair of rims the inner edges of which are spaced from each other and to mount a plurality of angled bars upon the peripheries of said rims which bars extend from the outer edge of one rim to the outer edge of the other and across the space between the facing inner edges of the rim.

With the foregoing and other objects in view, this invention consists in such novel features of construction, combination and arrangement of parts as will be hereinafter more fully described, illustrated in the accompanying drawings and claimed.

In describing the invention in detail, reference will be had to the accompanying drawings wherein like characters designate like and corresponding parts throughout the several views and in which:

Figure 1 is a side elevation of the improved tractor having parts of one of the drive wheels broken away.

Fig. 2 is a front elevation of the improved tractor having parts broken away.

Fig. 3 is a top plan of the frame of the structure.

Fig. 4 is a vertical section on the line 4—4 of Fig. 1.

Fig. 5 is a view partially in elevation and partially in section of the front wheel of the tractor.

Fig. 6 is a sectional view through the differential support which forms a part of the tractor structure.

Referring more particularly to the drawings, 1 designates the supporting frame of the tractor as an entirety which comprises side rails 2 and 3 which form the sides of the forward relatively narrow portion of the frame. The forward ends of the side rails 2 and 3 are connected by a usual cross bar 4 and the front corners of the frame are braced by suitable bracing plates 5. The side rails 2 and 3 angle outwardly forming outwardly angled portions 6 as clearly shown in Fig. 3 of the drawings. The side bars extend rearwardly from the outer terminal of the angled portion providing portions 7 which are parallel to the side rails along the relatively front portions of the frame. The rear ends of the portions 7 are connected to the cross bar 8 and suitable angled corner braces 9 are provided for bracing the rear corners of the frame. The side bars angle downwardly from the points 10 which is on a portion of the outwardly angling sections 6 of the side bars to the point 11 on the parallel portions 7 as clearly shown in Fig. 1 of the drawings. The rearwardly and downwardly angling portions which are indicated by the numeral 12 support bearings 13 which in turn rotatably support the rear axle 14 of the tractor. Suitable bearings identical with the bearings 13 are also supported by parallel bars 15 which are slightly spaced from each other substantially equidistant upon each side of the center of the tractor frame as clearly shown in Fig. 3. The rear ends of the bars 15 are braced by a plate 16 and their forward ends angle substantially at right angles to the portion 6, being connected thereto by suitable bracing plates 17. The main drive wheels of the tractor which are indicated by the numeral 18 are positioned one within each space between the adjacent bars 7 and 15. The supporting wheels 18 include hub portions 19 which are mounted upon the axle 14. The hub portions 19 are provided with bearing roller sockets 20 in which are mounted roller bearings 21 which will provide the necessary anti-friction surfaces. The bearing rollers 21 engage the axle 14. The hubs 19 are provided with a pair of outwardly extending annular flanges 22 and 23. The annular flange 22 is attached by metal spokes 24 to the rim 25 while the annular flange 23 is attached by metal spokes 26 to the rim 27. The rims 25 and 27 have their facing edges spaced as clearly shown in Fig. 2 of the drawings. The outer ends of the spokes 24 and 26 are angled as shown at 28 for providing portions to lie in facial abutment with portions of the inner surface of the rims 25 and 27.

Angle bars 30 are attached to the outer circumferences of the rims 25 and 27 and they extend entirely across the outer surface of each wheel structure, extending from the outer edge of the rim 25 to the outer edge of the rim 27 across the space between the facing edges of the rim. The angle bars 30 are positioned to provide radially extending portions to grip or bite into the ground over which the tractor is traveling.

Certain of the spokes 26 of each wheel structure have internal gears 31 attached thereto by means of bolts 32. Pinions 33 carried by the shaft 34 mesh with the teeth of the internal gears 31 for rotating the drive wheel of the tractor structure. The shaft 34 is connected, by the usual differential gear structure to the engine or prime mover 35 of the tractor which is supported by the relatively narrow front portions of the supporting frame 1.

The differential gear structure is supported by a saddle 36 carried by the sub-frame 15. The saddle 36 is attached to the sub-frame by suitable bolts 38 as shown in Fig. 6 of the drawing.

Suitable mud guards 40 are carried by the supporting frame 1 and extend over the drive wheel 18.

A bracket structure 41 is rotatably supported by means of a bolt 42 and suitable hangers 43 beneath the forward ends of the frame 1. The front axle 44 of the tractor is supported by the bracket 41 and it has the front supporting wheel 45 mounted thereon. The front supporting wheel 45 includes a hub structure 46 in which is mounted a bearing bushing 47. Suitable dust plates or caps 48 are attached to the ends of the hub structure 46 and prevent dust or dirt from entering the hub structures between the inner surface of the hub and the bushing 47 and also between the bushing 47 and bearing surface with the axle 44. The hub 46 and the bushing 47 are provided with lubricating openings 49 with which the outlet of grease cups 50 communicates to permit of the lubricating of the bearing surfaces of the front wheel structure. An annular centrally disposed rib 51 is formed upon the outer surface of the front wheel 45 equidistant of its side edges.

The bracket 41 has a drum structure 52 formed thereupon about which a cable 53 passes. The cable 53 is connected to the lower end of a steering post 54, in any suitable manner so that the rotation of the steering post will rotate the bracket 41 for guiding the direction of travel of the tractor. The ordinary usual type of hand wheel 55 is mounted upon the steering post 54 and this post is supported by a suitable bearing structure 56.

A seat 57 is supported by the usual type of spring standards 58 at the rear end of the frame 1 and the various control levers of the tractor structure are adapted to extend rearwardly along the frame 1 so that they may be conveniently reached by the operator seated upon the seat 57. A coupling 59 is carried by the rear or draw bar 8 of the tractor frame 1.

From the foregoing description taken in connection with the accompanying drawings the advantages of construction and the method of operation of the improved tractor will be readily apparent to those skilled in the art to which this invention appertains and, while in the foregoing description, the principle of the operation of this invention has been described together with various features of construction, it is to be understood that certain minor features of construction, combination and arrangement of parts may be altered to suit practical conditions provided such alterations are comprehended within the scope of what is claimed.

What is claimed is:

In a tractor, a main frame comprising side members having their relatively forward end portions extending parallel, their intermediate portions inclined outwardly and rearwardly thence downwardly and rearwardly in parallel relation, and their rear portions horizontal and parallel and in the plane of the intermediate downwardly and rearwardly parallel portions of the respective members, cross members connecting the ends of the side members, intermediate members paralleling the rear portions of the side members, and having their front end portions outwardly and forwardly inclined and secured to the rear ends of the forward parallel end portions of the side members and their rear ends secured to the rear cross bar, a steering wheel disposed in line with the space formed between the forward parallel end portions of the side members, and tractor wheels located in line with the spaces formed between the intermediate members and the rear and intermediate portions of the side members and mounted on the downwardly and rearwardly inclined portions of both members.

In testimony whereof I affix my signature in presence of two witnesses.

FRED MILES STILGENBAUER.

Witnesses:
PAUL R. RIESS,
G. W. STILGENBAUER.